W. EDSON.
Coffee Pot.
No. 58,396. Patented Oct. 2, 1866.
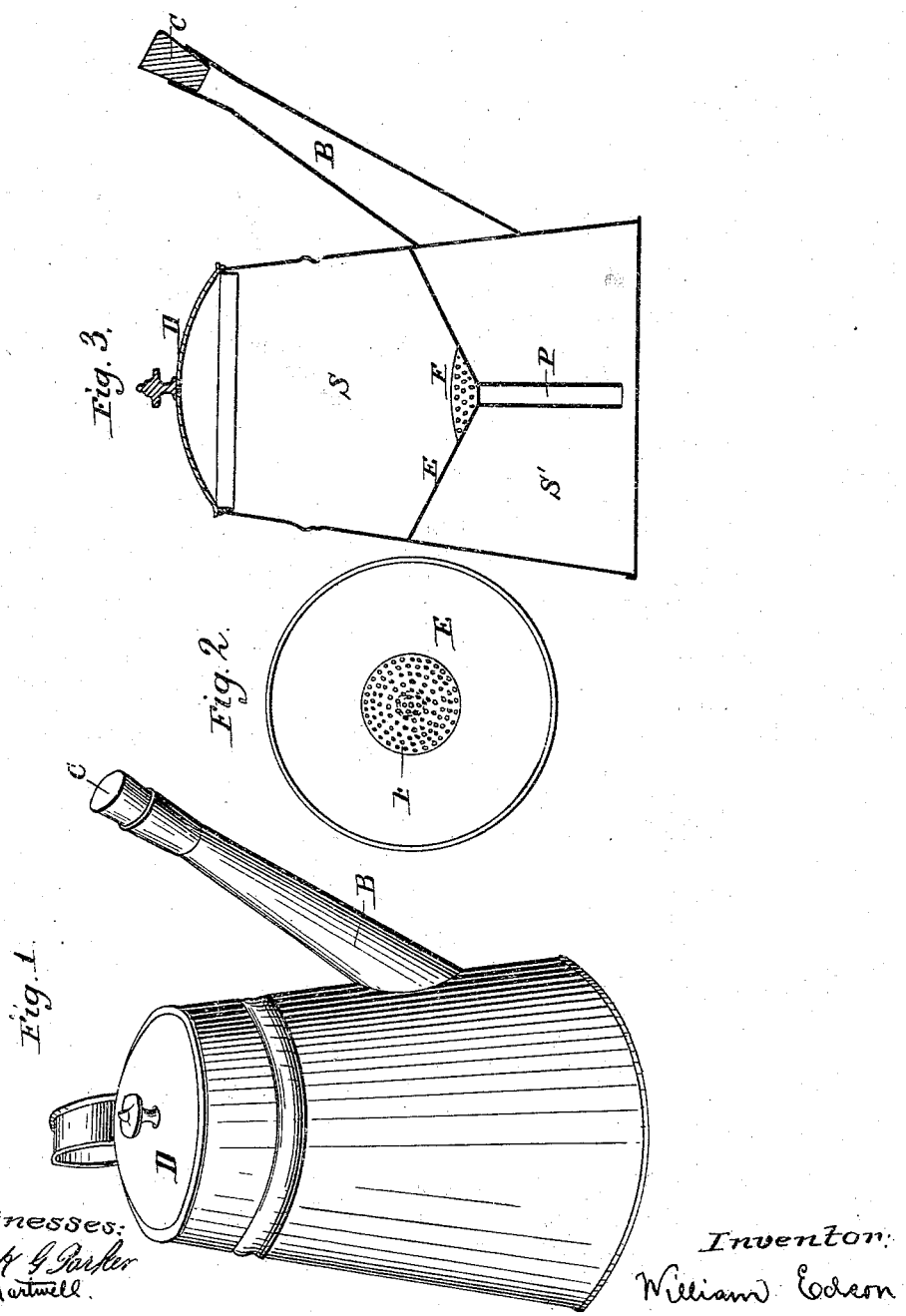

UNITED STATES PATENT OFFICE.

WILLIAM EDSON, OF BOSTON, MASSACHUSETTS.

COFFEE-POT.

Specification forming part of Letters Patent No. 58,396, dated October, 2 1866.

*To all whom it may concern:*

Be it known that I, WILLIAM EDSON, of Boston, in the county of Suffolk and State of Massachusetts, have invented an Improved Coffee-Pot; and I do hereby declare that the following is a full and exact description thereof, reference being had to the accompanying drawings, and to the letters of reference marked thereon.

The nature of my invention consists in simplifying the arrangement and construction of that class of coffee-pots known under various designations, such as "French," "Turkish," "vacuum," "balance," &c.

By my invention I combine the good qualities of all, and still make a coffee-pot so cheap that it is within the reach of the public at large, and so simple in its construction that the most ordinary workman may make it.

To enable others skilled in the art to make and use my invention, I will proceed to describe its construction and use.

Figure 1 is a perspective view of the pot entire, made in a cheap form. Fig. 2 is a plan of the diaphragm E', shown in Fig. 3. Fig. 3 is a vertical section.

To a pot made in the ordinary manner I add the diaphragm E, Figs. 2 and 3. This diaphragm is soldered tight to the sides of the pot, as shown in Fig. 3, and has a single opening in its center, at which the pipe P is soldered. The pipe P is opened at both its upper and lower ends, and through it alone there is communication between the upper compartment, S, and the lower compartment, S', of the coffee-pot.

In the center of the diaphragm E is the strainer F, the object of which will be explained in the operation.

B is the pouring-spout, made in the ordinary manner, but provided with a tight-fitting stopper, C.

D is a cover, made in the ordinary manner.

Operation: To use my invention, first close the nose of the improved coffee-pot; then pour in hot water (cold will do) until the pot is nearly full. Now open the nose for a moment for the water to run into the lower part of the pot. When the water has all disappeared from the upper part reclose the nose, throw in the ground coffee, and set the pot on the stove. As soon as it comes to a boil, remove the pot from the stove and it will be ready to use.

The time to take the pot from the stove is when you find, by looking into it, the upper part is full of boiling coffee. The time to pour out the coffee is when the fluid has all disappeared from the upper part, and nothing remains but the dry grounds upon the strainer F.

The spirit of my invention consists in making a coffee-pot with a single diaphragm, E, said diaphragm being provided with pipe P, the whole being so arranged, in combination with the closed pouring-spout B, that when the water in the lower chamber boils it shall be forced, by its own steam, into the upper chamber S, and that when the whole begins to cool a vacuum shall be formed in the lower chamber, and forcibly draw back through the pipe P the liquid coffee from the upper chamber, S, leaving the grounds upon the strainer F.

I am aware that this same object has been completely accomplished by a French invention, (see Veyron's Brevet d'Invention,) called the "vacuum coffee-pot;" but the arrangement is complicated and expensive. I am also aware that several coffee-pots have been invented in which the boiling water is forcibly sent into another chamber by the force of its own steam; but I do not think there has heretofore been invented any coffee-pot in which the complete operation is secured by means so simple as mine.

What I claim as my invention, and desire to secure by Letters Patent, is—

As an improved article of manufacture, a coffee-pot provided with a fixed diaphragm, E, pipe P, strainer F, and otherwise made as shown and described, and for the purpose set forth.

WILLIAM EDSON.

Witnesses:
 FRANK G. PARKER,
 A. HUN BERRY.